United States Patent [19]

Wingate

[11] 4,437,686
[45] Mar. 20, 1984

[54] ADJUSTABLE AND REPAIRABLE FLOW DIVERTER FOR FOOD PROCESSING EQUIPMENT

[75] Inventor: Clarence W. Wingate, Rochester, N.Y.

[73] Assignee: Fluid Operations & Equipment, Inc., North Chili, N.Y.

[21] Appl. No.: 289,496

[22] Filed: Aug. 3, 1981

[51] Int. Cl.³ .............................................. F16L 25/00
[52] U.S. Cl. ...................................... 285/12; 285/15; 285/93; 285/157; 285/158; 285/177
[58] Field of Search ................... 285/12, 15, 157, 124, 285/125, 126, 158, 161, 177, 93

[56] References Cited

U.S. PATENT DOCUMENTS

| | | | |
|---|---|---|---|
| 803,687 | 11/1905 | Grotewohl | 285/158 X |
| 1,512,219 | 10/1924 | Goosmann | 285/124 X |
| 2,537,678 | 1/1951 | Koetting | 285/158 X |
| 4,079,970 | 3/1978 | Brett | 285/158 |
| 4,295,667 | 10/1981 | Zahs et al. | 285/157 X |

*Primary Examiner*—Dave W. Arola
*Attorney, Agent, or Firm*—Stonebraker, Shepard & Stephens

[57] ABSTRACT

An adjustable and repairable flow diverter for food processing equipment 10 includes a mounting plate 11 supporting junctions 13–15 so that a movable jumper 12 can variably interconnect pipes 27 and 28 leading to the plate. The junctions are formed as coupler tubes 23–25 with a connection at one end for the pipes and a connection at the other end for the jumper. The plate has tube holes 41 arranged to receive the coupler tubes, and the tube holes are larger than the outside diameter of the coupler tubes and large enough to allow the coupler tubes to be axially removed from and replaced in the plate. Each of the coupler tubes 23–25 has an encircling collar 43–45 with an outside diameter substantially larger than tube holes 41, and studs 46 are secured to the collars at equiangular spacing around the collars to be parallel with the axes of the coupler tubes. The plate has stud holes 56 arranged at equiangular positions around the tube holes 41 for receiving the collar studs, and the stud holes and tube holes are large enough to allow eccentric, axial and inclination adjustment of the coupler tubes relative to the plate.

7 Claims, 2 Drawing Figures

ADJUSTABLE AND REPAIRABLE FLOW DIVERTER FOR FOOD PROCESSING EQUIPMENT

BACKGROUND

Flow diverters are used in the food processing industry as a way of mechanically changing flow routes through pipes. The pipes all lead to a mounting plate supporting junctions that can be selectively interconnected, and a movable jumper that can be connected in different ways between the junctions at the plate supplies the variable interconnections. The pipes, jumper, junctions, plate, and associated equipment are typically made of stainless steel, and the junctions are welded to the plate in a suitable pattern so that the jumper can make the desired interconnections between the pipes. The pipes connect to the junctions at the back side of the plate, and the jumper interconnects the junctions at the front side of the plate so that a few minutes with a wrench can change the pipe connections.

Such flow diverters are typically inaccurate, troublesome, and leaky because of the many discrepancies that can occur. It is very difficult to bring all the pipes to exactly matching terminations with the plate junctions, and the plate junctions are never perfect because of slight inaccuracies in machining and larger distortions from welding. So food processors often build a sink under such flow diverters to catch the leaks that are bound to occur.

Flow diverters are also difficult to repair or modify when threads become damaged or worn and pipes or couplings need altering or replacing. Even minor changes may require discarding the old diverter and building a new one.

I have discovered a simple and effective way of making such flow diverters both adjustable and easily repaired. Flow diverters according to my invention are also more versatile in accommodating different connections, are easily assembled and reassembled in different arrangements, and are substantially free from leaks. At the same time, my diverters are simple and inexpensive to fabricate so that they reduce cost while increasing performance, convenience, and reliability.

SUMMARY

My adjustable and repairable flow diverter for food processing equipment includes a mounting plate supporting junctions for variable connection of pipes leading to the plate and allows a movable jumper to be connected between the junctions at the plate for variably interconnecting pipes. The junctions are formed as coupler tubes having a connection at one end for the pipes, and a connection at the other end for the jumper. The plate has tube holes arranged to receive the coupler tubes, and the tube holes are larger than the outside diameter of the coupler tubes and large enough to allow the coupler tubes to be axially removed from and replaced in the plate. Each of the coupler tubes has an encircling collar with an outside diameter substantially larger than the tube holes, and studs are secured to the collars at equiangular spacing around the collars to be parallel with the axes of the coupler tubes. The plate has stud holes arranged at equiangular positions around the tube holes for receiving the collar studs, and the stud holes and tube holes are large enough relative to the coupler tubes and collar studs to allow eccentric, axial, and inclination adjustment of the coupler tubes relative to the plate. Nuts on the studs secure the collars to the plates and hold the coupler tubes in an adjusted position for connection to both the pipes and the jumper.

DRAWINGS

FIG. 1 is a front elevational view of a simple preferred embodiment of my flow diverter; and FIG. 2 is a side elevational view of the flow diverter of FIG. 1.

DETAILED DESCRIPTION

Figure 1:
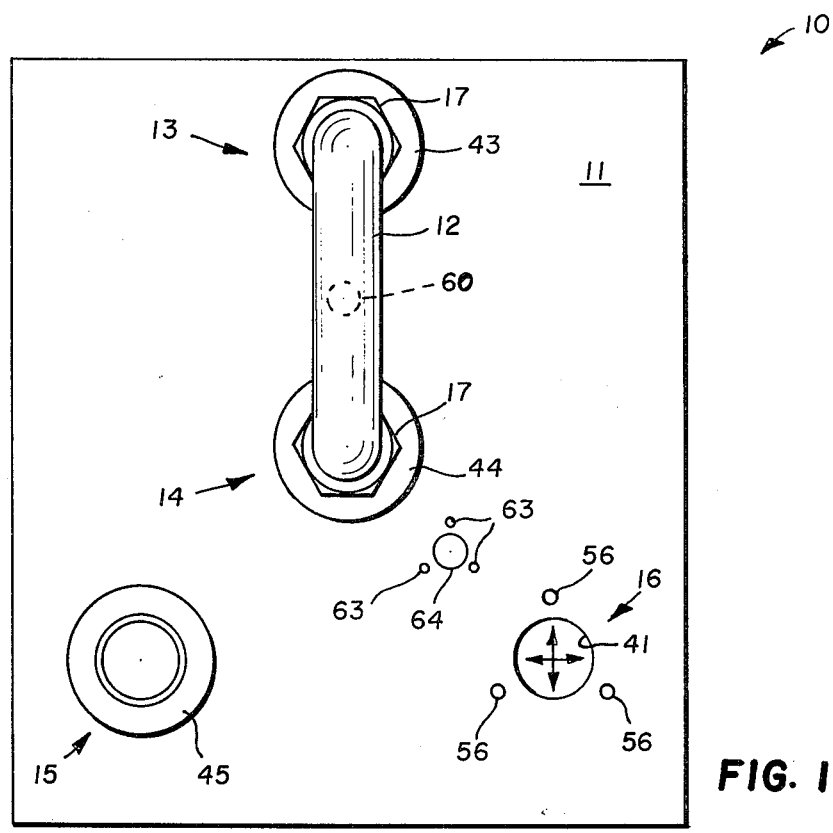
Figure 2:
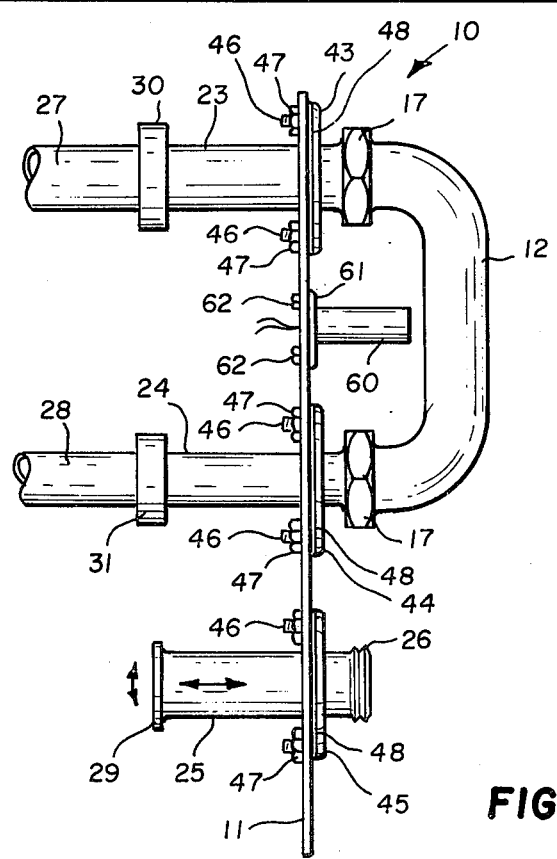

Flow diverter 10 as shown in the drawings is made relatively simple for convenience of illustration. It includes a mounting plate 11, a jumper 12 extending between a pair of junctions 13 and 14, another junction 15 to which jumper 12 can be connected, and a potential junction 16 for possible future use. Flow diverters can have many different numbers of junctions arranged in many different patterns for interconnection by different shaped jumpers. Couplings, connections, and accessories can also vary widely.

Mounting plate 11 and jumper 12 are conventional, and jumper 12 has the usual pipe union nuts 17 on its ends for interconnection to threaded junctions arranged on plate 11. Wrench adjustment of pipe union nuts 17 is preferred, although other couplings and clamps can be used.

Junctions 13, 14 and 15 are formed of coupler tubes 23, 24, and 25 respectively adjustably mounted on plate 11. The jumper ends of coupler tubes 23-25 have male threads 26 as shown on coupler tube 25 to receive union nuts 17 on jumper 12. The other ends of coupler tubes 23-25 are formed to connect to pipes that terminate near the back of plate 11. Many different pipe connections and clamping arrangements are possible for joining pipes to couplers, and as one possibility, a flange 29 as shown on coupler 25 can be joined to a pipe with clamps 30 and 31 as schematically illustrated between couplers 23 and 24 and pipes 27 and 28.

Plate 11 has tube holes 41 such as shown at junction region 16, and tube holes 41 are also located at junctions 13-15 and wherever junctions are desired on plate 11. Tube holes 41 are larger than the outside diameter of couplers 23-25, and are larger than any flange 29 or other coupling at the pipe end of coupler tubes 23-25 so that these can be freely inserted in and removed from holes 41. Holes 41 are also preferably large enough to accommodate the largest diameter coupler tubes that plate 11 can be expected to need so that different diameter coupler tubes can be used, and coupler tubes can be replaced and interchanged freely on mounting plate 11.

Each of the coupler tubes 23-25 has an encircling collar 43-45 respectively and these collars are preferably welded to the coupler tubes. Collars 43-45 provide adjustable mounts for coupler tubes 23-25, and collars 43-45 all have the same outside diameter and an inside diameter that fits their respective coupler tubes. This is apparent from small diameter coupler tube 24 having a collar 44 with the same outside diameter as collar 43 on larger coupling tube 23, and it allows mounting of different size tubes with the same size collars at any junction region on plate 11.

Collars 43-45 have studs 46 at equiangular spacing around the collars to be parallel with the axes of the coupler tubes. Plate 11 has corresponding stud holes 56 arranged at the same equiangular positions around tube holes 41 for receiving collar studs 46. Studs 46 on any collar for any size coupler tube can then fit through stud holes 56 in plate 11.

Stud holes 56 are also larger than studs 46, and in cooperation with tube holes 41 being larger than coupler tubes 23-25, this allows freedom of movement for both eccentric and angular inclination adjustment of each coupler tube relative to plate 11. Eccentric adjustment is indicated by the arrows within hole 41 at junction region 16, and angular adjustment is indicated by the arrows at the pipe end of coupler tube 25. Eccentric and inclinational adjustment of coupler tubes 23-25 on plate 11 can compensate for acceptably small machining inaccuracies in plate 11 and slight deviations between pipes leading to plate 11.

Plate 11 is preferably formed by numerically controlled punching equipment that can be reliably accurate to within 0.005 inches; also, mounting coupler tubes on plate 11 with studded collars, rather than welding, avoids warping, distortion, and welding inaccuracies that have caused considerable problems in previous flow diverters. Assembly of coupler tubes to plate 11 with studded collars can achieve both higher accuracy for the diverter and also provide freedom of adjustment motion to compensate for slight discrepancies in pipe terminations. Small ranges of eccentric movement and angular inclination are ordinarily adequate to align a coupler tube with a pipe and a jumper to ensure leak-proof connections, and compressible gaskets, O-rings, and the like can accommodate some positional variation as coupler tubes 23-25 are adjustably mounted on plate 11 for accurate connections with jumper 12 and their respective pipes.

Coupler tubes are also adjustable in the direction of their axes as shown by the arrows on coupler tube 25, and such axial adjustment can be accommodated by nuts 47 on studs 46. Shims, seals, and different sizes of the illustrated O-ring 48 can be arranged between plate 11 and the underside of collar 45 to help accommodate such an axial adjustment. The capacity for slight axial adjustment is especially useful in compensating for slight errors in pipe terminations relative to the plane where other pipes terminate at the back side of plate 11.

Plate 11 also conveniently mounts a proximity switch guard 60 for detecting the position of jumper 12 in automatic and semi-automatic control systems. Proximity switch guard 60 also preferably uses a mounting collar 61 so that it can be attached to plate 11 by studs 62 secured to collar 61 and extending through stud holes 63 around a guard hole 64. Holes 63 and 64 can be formed in plate 11 wherever a proximity switch may be desired for detecting the presence of jumper 12, and proximity switches within guards 60 can be added whenever desired. Guards 60 are preferably positioned where they will not be damaged by a wrench and where they also will dispose a proximity switch for proper operation.

Junctions assembled onto a plate according to the invention can be made more reliably accurate to fit jumper 12, for leak-free operation in any arrangement. And pipes leading to such adjustably mounted coupler tubes also have a slight leeway easing the accuracy burden imposed on the plumber. Adjustable diverter junctions according to the invention are also easily replaced, rearranged, or interchanged for repair or redesign purposes and make the diverter more versatile and trouble-free without increasing its cost. Workers skilled in the food processing equipment art will understand how the invention can be applied to many different arrangements of flow diverters that are required to meet different circumstances.

I claim:

1. An adjustable and repairable flow diverter for food processing equipment, said diverter including a mounting plate, supporting junctions for variable interconnection of pipes leading to said plate and a movable jumper connectable between said junctions at said plate for variably interconnecting said pipes, said diverter comprising:
   a. said junctions being formed as coupler tubes mounted on said plate;
   b. said coupler tubes having means at one end for connecting to said pipes;
   c. said coupler tubes having means at another end for connecting to said jumper;
   d. said plate having tube holes arranged to receive said coupler tubes;
   e. said tube holes being larger than the outside diameter of said coupler tubes and large enough to allow said coupler tubes to be axially removed from and replaced in said plate;
   f. each of said coupler tubes having an encircling collar;
   g. said collars having outside diameters substantially larger than said tube holes;
   h. studs secured to said collars at equiangular spacing around said collars to be parallel with the axes of said coupler tubes;
   i. said plate having stud holes arranged at equiangular positions around said tube holes for receiving said collar studs;
   j. said stud holes and said tube holes being large enough relative to said coupler tubes and said collar studs to allow eccentric, axial, and inclination adjustment of said coupler tubes relative to said plate; and
   k. nuts on said studs securing said collars to said plates to hold said coupler tubes in an adjusted position for connection to said pipes and said jumper.

2. The flow diverter of claim 1 wherein said coupler tubes have different diameters and said collars on said different diameter coupler tubes have the same outside diameters and carry said studs in the same equiangular positions so that different size coupler tubes can be interchangeably mounted and adjusted in the said tube and stud holes.

3. The flow diverter of claim 1 including a sealing ring arranged between said collar and said plate.

4. The flow diverter of claim 1 wherein said collars are arranged on said coupler tubes near the ends of said tubes that connect to said jumper, and said pipe connecting ends of said coupler tubes are movable through said tube holes.

5. The flow diverter of claim 4 wherein said coupler tubes have different diameters and said collars on said different diameter coupler tubes have the same outside diameters and carry said studs in the same equiangular positions so that said different size coupler tubes can be interchangeably mounted and adjusted in the said tube and stud holes.

6. The flow diverter of claim 5 including a sealing ring arranged between said collar and said plate.

7. The flow diverter of claim 1 including tubular guards housing proximity switches mounted on said plate for detecting the position of said jumper.

* * * * *